March 17, 1953     J. S. BAILEY     2,631,334
PROCESS OF MAKING THIN FREE FILMS
Filed Dec. 27, 1947
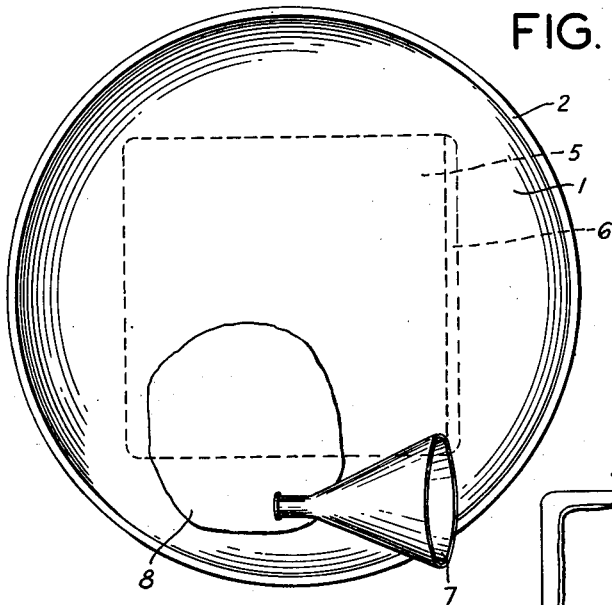
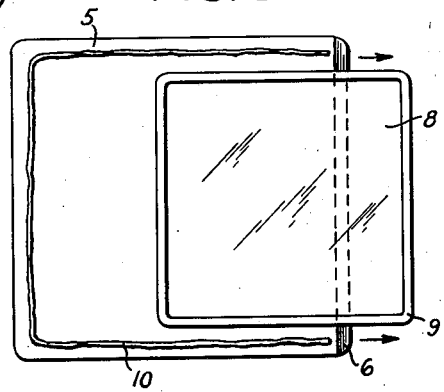
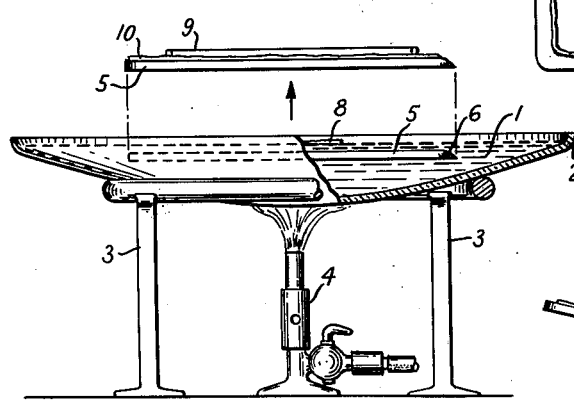
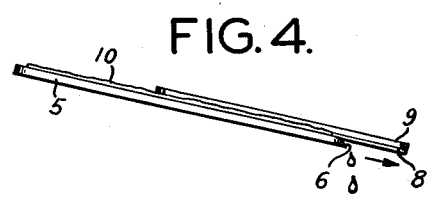
*INVENTOR.*
JAMES S. BAILEY
BY
*ATTORNEY.*

Patented Mar. 17, 1953

2,631,334

UNITED STATES PATENT OFFICE 2,631,334

PROCESS OF MAKING THIN FREE FILMS

James S. Bailey, Chicago, Ill., assignor to The Rauland Corporation, Chicago, Ill., a corporation of Illinois Application December 27, 1947, Serial No. 794,137

7 Claims. (Cl. 18—57)

This invention relates to the production of thin films of synthetic resins, particularly resin of the type known as nylon, unsupported by a surface and therefore known as free films. Such films or sheets have heretofore been made by drawing out the thicker sheets; but in practice the thinness of films made by this method is limited and much thinner sheets or free films are desirable for various technological purposes.

In particular, such films would be useful for shielding or sealing sensitive instruments responsive to particles or conditions which will not be materially blocked by a very thin film. For instance, to permit adequate passage of one type of particle, a free film not more than six hundred thousandths of an inch thick and which possesses substantial toughness and resistance to abuse is required. Such a film cannot be produced by prior methods, though obtainable by the process hereafter set forth.

However, the extreme thinness of such free films presents many difficulties in obtaining uniform thickness and continuity in films of useful size, and in avoiding serious spoilage of films by rupture or distortion during production, especially before the film material has completely solidified and hardened.

The general object of this invention is to provide an improved method of producing extremely thin free films of synthetic resins and especially of nylon. More specifically, an object is to produce such films having a thickness of less than two thousandths of an inch and advantageously less than one thousandth of an inch. Further purposes are to provide a method of this type that is practicable, adapted to commercial production of such films, readily controlled and which produces reasonably uniform results under operating conditions.

In general, a thermoplastic material, preferably a synthetic resin, is dissolved in a volatile solvent and is heated until the solution is a liquid having low viscosity. It is then poured onto the surface of a hot liquid, such as water, which does not mix with the solution and on which the solution floats and spreads. The solution must be sufficiently fluid at the temperatures employed to spread over the hot liquid surface to form a uniform continuous very thin film, and the temperature of the liquid must be sufficiently high to maintain the solution in such fluid condition until it has spread to the desired extent.

The film is then allowed to solidify until it is sufficiently tenacious to be self-supporting. A relatively rigid frame of material to which the hot resin will adhere is then lowered into contact with the film, and is carefully removed with the adherent film, which is then cooled, the adherent liquid and any remaining solvent being volatilized, producing a very thin but uniform free film or sheet. This film may be stretched on the same or another frame, advantageously after volatilization is complete, to reduce the thickness of the film.

It will be evident that the specific conditions under which the various steps of this process are carried out will vary with the resin employed, the solvent and any plasticizer that may be used, and the desired thickness of the film. However, these factors are known and understood by those skilled in the art. The viscosity must be low enough at the temperatures employed so that a uniform continuous film of the requisite thinness will be produced. The temperatures of the solution and of the bath liquid should not be high enough to volatilize the solvent at a rate that would interfere with the dispersion of the solution on the liquid to form the desired film.

The conditions which will be suitable for any particular synthetic resin and solvent can readily be determined by comparison with the specific conditions hereafter given in connection with the formation of a film of nylon.

A feature of the invention is an improved method of removing the very delicate film from the surface of the bath without rupture. In this method a plate of material which will not adhere to the film is submerged in the bath with a flat upper surface of the plate located just below and parallel to the surface of the liquid. Glass has been found to be a suitable material for the plate. A removal frame is provided, which advantageously is annular, with a plane lower face; and the amount of resin solution poured on the bath is sufficient when spread out to cover an area somewhat greater than that enclosed by the frame.

The frame is lowered gently onto the film, its lower face contacting and adhering to the film. The frame descends until it rests on the plate, trapping a small amount of liquid. The plate is then raised gradually into position above the bath surface, keeping the upper surface of the plate horizontal so that the liquid will flow out evenly under the frame. Portions of the film which extend beyond the frame and rest on the plate are advantageously shaped manually into a ridge or dam extending along the plate surface around the frame and retaining some of the residual bath liquid.

The supporting plate is then tilted downwardly toward one edge, which advantageously is beveled or curved downwardly; and of course the ridge or dam does not extend along this edge. The frame carrying the film is carefully slid off of the plate over the deflected edge, the residual bath liquid on the plate serving as a lubricant.

The frame and free film are then supported in vertical position until the residual bath liquid and solvent are volatilized. This may be accelerated by warm air, which reduces the likelihood of water marks on the film.

After the film has been dried until it is sufficiently tough to stand handling it may be transferred to another frame and stretched to produce an even thinner film. While the stretching may be performed after volatilization is completed, it is frequently advantageous to stretch the film before the completion of volatilization and while the material is still somewhat more plastic than when it becomes fully dried.

This process has been particularly useful in the formation of thin films of polyamid synthetic resins commercially known as nylon; and the following example of the process as applied to this material is given to illustrate the invention.

The solvent is advantageously composed of a volatile alcohol such as ethyl alcohol and water, a suitable solvent being produced by combining four parts of ethyl alcohol (190 proof grain alcohol) and one part distilled water. The proportion of nylon to solvent depends upon the thickness of film desired, and the viscosity must be high enough to assure a continuous film. A suitable formula which can be used to produce a film less than 0.00007 inch in thickness is as follows:

80 cc. ethyl alcohol
20 cc. distilled water
11.5 grams nylon

The nylon used was the product made by E. I. Dupont de Nemours Co. of Wilmington, Delaware, designated as FM6001 flake. The mixture is placed in an Erlenmeyer flask in a water bath maintained at a constant temperature of 140° F. to 145° F., and is agitated until all the nylon has been dissolved. Using an agitator, this may take about an hour. The solution is then maintained at a temperature of about 130° F.

The dimensions of the apparatus used to form the film will, of course, vary with the size of the film that is to be produced.

One practical arrangement is illustrated in the accompanying drawings in which

Fig. 1 is a plan view of the bath with the supporting plate in place and the film starting to spread during pouring;

Fig. 2 is a side elevation of Fig. 1 indicating in dotted lines the position of the support and frame after initial removal from the bath;

Fig. 3 is a plan view of the support and frame carrying the film during the early part of the removal of the frame from the support; and Fig. 4 is a side elevation of Fig. 3.

In this embodiment the bath of water 1 is placed in a round shallow Pyrex dish 2 about a foot in diameter mounted on legs 3 and heated by a Bunsen burner 4 to maintain the bath at the desired temperature, advantageously about 125° F. The supporting plate 5, which may be made of window glass in square form, about eight inches square, with rounded corners and a rounded or beveled edge 6, is proportioned so that when it is placed in the bath with the corners resting on the dish 2 its upper surface will be about 1/8 of an inch below and parallel to the surface of the water 1. The hot solution is poured carefully from the flask 7 onto the hot water 1, advantageously holding the mouth of the flask about a quarter of an inch above the bath at one edge of the dish as shown in Fig. 1, and sufficient solution is poured so that the area covered will be greater than that of the frame, which can be judged by watching the film 8 spread over the surface of the bath. A suitable frame may be made of an aluminum strip $\frac{1}{32}$ of an inch thick and 1/8 to $\frac{3}{16}$ inch wide, bent to form a closed rectangular frame 9. A frame successfully used was approximately 6½ inches by 7½ inches, with the broader side of the strip in the same plane, as shown in Figs. 3 and 4.

After the film 8 starts to harden, which is indicated by a reticulated appearance caused by initial crystallization, the frame is gently lowered onto the film, the lower face of the aluminum strip engaging and adhering to the film and descending until the frame is supported by the plate 5. The latter is then slowly raised as indicated in Fig. 2, the surplus water draining outwardly under the lower edge of the frame and film, and the portions of the film outside of the frame are pushed toward the edge of the plate 5 and shaped to form a liquid retaining ridge 10.

When the excess water is thus disposed of, the frame 9 with the film 8 adhering to it is slid gently off of the plate 5 over the deflected edges 6 as shown in Figs. 3 and 4, the slight tilt of the plate causing the residual water on the plate to move off with the film, reducing the probability of film rupture. The frame 9 is then hung or otherwise supported in vertical position until the film 8 is dry.

It will be evident that the specific figures given in connection with this example can be varied without departing from the invention. The concentration of nylon in the solution can be varied and in particular may be increased if somewhat thicker films are desired. However, the amount of nylon should not be substantially less than about 9 grams for the 100 cc. of solvent set forth above, and may be as high as 20 grams. The temperature of the solution may be also varied, though of course it should always be substantially above atmospheric temperature and below the boiling point of water. Solution temperatures between 110° F. and 140° F. can be used, the higher temperatures being desirable for thinner films. The temperature of the bath must be high enough to permit dispersion of the solution to form a film of the requisite size and thickness before the film starts to solidify, and should be between 105° F. and 135° F.

By employing the above process useful continuous films of nylon have been made having a thickness of less than five hundred thousandths of an inch, such films being of an order of thinness substantially below that of films of similar materials made by prior known processes.

The very thin film made in accordance with this invention may be used to provide shields for instruments used in the detection of radiations from radioactive substances, such as the Geiger counter. In instruments of this type which have an open ionization chamber the operation may be seriously affected by drafts which cause the meter reading to deviate, and by dirt particles in the air which become active and cause erroneous readings. However, while it is desirable to seal such chambers, the alpha particles have extremely short paths and very poor penetration qualities. Previously known sheets of shielding material are incapable of permitting adequate passage of the particles to permit proper operation of such measuring devices.

It has been found that free films made in accordance with this invention and having a thickness of less than seven hundred-thousandths of an inch, preferably less than six hundred-thousandths of an inch, will pass an adequate amount of the alpha particles to permit satisfactory operation of the meter. Films having a thickness of not more than six hundred thousandths of an inch will pass at least 75 per cent of the alpha particles.

It is furthermore necessary that films for this purpose should be relatively tough and tenacious in order to withstand the usage to which such meters are subjected, and must remain reasonably intact even though punctured. It is also desirable that the film should have sufficient strength to support an electrostatic shield, such as a shield applied to the film by condensation of vaporized metal. It has been found that nylon films which have a thickness not greater than six hundred thousandths of an inch have these characteristics and are practical for use as shields across the ionizing chambers of Geiger counters.

What is claimed is:

1. A process of producing a very thin free film of nylon material which comprises preparing a hot solution of low viscosity containing the nylon material, dispersing the hot solution on the surface of a bath of hot water to form a film, solidifying the film while on said surface applying to the film an adherent frame, resting the frame with film attached thereto on a support located below the surface of the liquid in the bath, and removing the support together with the frame and film from the bath.

2. A process of producing a very thin film of nylon which comprises preparing a hot solution of nylon in a volatile solvent to form a liquid of low viscosity, dispersing said hot solution on the surface of a bath of hot water, allowing the solution to spread on the surface of the bath, the viscosity of the solution being sufficiently low to form a very thin continuous film on the bath, solidifying the film, applying to the film an adherent frame, resting the frame with film attached thereto on a support located below the surface of the liquid in the bath, and removing the support together with the frame and film from the bath.

3. A process of producing a thin free film of material which comprises dispersing the material in hot liquid condition on the surface of a bath of hot water to form a film, solidifying the film on the bath, applying to the film an adherent frame, resting the frame with film attached upon a support located below the surface of the liquid in the bath, removing the support together with the frame and film from the bath, draining liquid from the support and removing the frame and film from the support.

4. A process as set forth in claim 3, in which the support has a flat upper surface and the frame and film are removed from the support by sliding them laterally over an edge of the support.

5. A process of producing a very thin free film of thermoplastic material which comprises preparing a hot solution of nylon comprising between 9 and 20 grams of nylon for each 100 cc. of solvent and in which the solvent consists of 80 percent by volume ethyl alcohol and 20 percent by volume distilled water, dispersing the hot solution on the surface of a bath of hot water to form a film, solidifying the film while on said surface and applying to the film an adherent frame, resting the frame with film attached thereto on a support, located below the surface of the liquid in the bath, and removing the support together with the frame and film from the bath.

6. A process as set forth in claim 5, and in which the solution comprises 11.5 grams of nylon for each 100 cc. of solvent.

7. A process of producing a film of nylon material of a thickness between five and seven hundred thousandths of an inch which comprises preparing a hot solution of low viscosity containing the nylon material, dispersing the hot solution on the surface of a bath of hot water to form a film, solidifying the film while on said surface applying to the film an adherent frame, resting the frame with film attached thereto on a support located below the surface of the liquid in the bath, and removing the support together with the frame and film from the bath.

JAMES S. BAILEY.

REFERENCES CITED

The following references are of record in the file of this patent:

UNITED STATES PATENTS

| Number | Name | Date |
|---|---|---|
| 826,781 | Gregory | July 24, 1906 |
| 2,141,169 | Catlin | Dec. 7, 1938 |
| 2,176,153 | Semon | Oct. 17, 1939 |
| 2,219,700 | Perrin | Oct. 29, 1940 |
| 2,278,722 | Loiseleur | Apr. 7, 1942 |
| 2,285,009 | Brubaker et al. | June 2, 1942 |
| 2,303,871 | Walker | Dec. 1, 1942 |
| 2,353,717 | Francis | July 18, 1944 |
| 2,368,486 | Mullane | Jan. 30, 1945 |
| 2,465,821 | Smoluchowski | Mar. 29, 1949 |
| 2,485,372 | Farrell | Oct. 18, 1949 |
| 2,485,373 | Farrell | Oct. 18, 1949 |
| 2,562,373 | Arnold | July 31, 1951 |

OTHER REFERENCES

Ser. No. 364,354, Moller (A. P. C.), published Apr. 27, 1943.

Korff, Electron and Nuclear Counters, D. Van Nostrand Co., N. Y., April 1946. (Copy in Scientific Library.) Pages 125–130.